United States Patent
Boulle et al.

(10) Patent No.: US 10,109,202 B2
(45) Date of Patent: Oct. 23, 2018

(54) METHOD AND SYSTEM FOR DETERMINING A VERTICAL TRAJECTORY OF AN AIRCRAFT

(71) Applicant: DASSAULT AVIATION, Paris (FR)

(72) Inventors: Eric Boulle, Mouries (FR); Jean-Philipe Roue, Garches (FR)

(73) Assignee: DASSAULT AVIATION, Paris (FR)

( * ) Notice: Subject to any disclaimer, the term of this patent is extended or adjusted under 35 U.S.C. 154(b) by 53 days.

(21) Appl. No.: 15/063,444

(22) Filed: Mar. 7, 2016

(65) Prior Publication Data

US 2016/0275800 A1 Sep. 22, 2016

(30) Foreign Application Priority Data

Mar. 16, 2015 (FR) ..................... 15 00517

(51) Int. Cl.
*G08G 5/00* (2006.01)
*G08G 5/02* (2006.01)
(Continued)

(52) U.S. Cl.
CPC ........... *G08G 5/0039* (2013.01); *G05D 1/042* (2013.01); *G05D 1/063* (2013.01); *G05D 1/0623* (2013.01);
(Continued)

(58) Field of Classification Search
CPC .. G08G 5/0039; G08G 5/0052; G08G 5/0056; G08G 5/006; G08G 5/0065;
(Continued)

(56) References Cited

U.S. PATENT DOCUMENTS 4,709,336 A * 11/1987 Zweifel ............... G05D 1/0676
701/5
8,014,907 B2 * 9/2011 Coulmeau ........... G08G 5/0039
701/3
(Continued)

FOREIGN PATENT DOCUMENTS

FR 2 949 577 A1 3/2011
FR 2 969 753 A1 6/2012
WO WO 2013/082657 A1 6/2013

OTHER PUBLICATIONS

French Search Report of priority application.

*Primary Examiner* — Dale W Hilgendorf
(74) *Attorney, Agent, or Firm* — Davidson, Davidson & Kappel, LLC

(57) ABSTRACT

A method and system for determining in real time a vertical trajectory of an aircraft is provided. The method includes a step for providing an initial vertical trajectory comprising an initial phase for changing flight level according to a first slope, between a first point at a first altitude, and a second point at a second altitude, at least one step for modifying the vertical trajectory, comprising a phase for detecting a triggering element when the aircraft is at the first altitude, when said triggering element is detected, and a phase for determining a modified vertical trajectory, said modified vertical trajectory comprising a modified phase for changing flight level according to a second predefined slope, from a modified point at said first altitude, distinct from said first point, to said second altitude.

16 Claims, 3 Drawing Sheets

(51) Int. Cl.
*G05D 1/10* (2006.01)
*G05D 1/04* (2006.01)
*G05D 1/06* (2006.01)

(52) U.S. Cl.
CPC ......... *G05D 1/0638* (2013.01); *G05D 1/0661* (2013.01); *G05D 1/0676* (2013.01); *G05D 1/101* (2013.01); *G08G 5/025* (2013.01); *G05D 1/0653* (2013.01); *G08G 5/006* (2013.01); *G08G 5/0052* (2013.01); *G08G 5/0065* (2013.01)

(58) Field of Classification Search
CPC ........ G08G 5/025; G05D 1/101; G05D 1/042; G05D 1/0623; G05D 1/063; G05D 1/0638; G05D 1/0653; G05D 1/0661; G05D 1/0676
See application file for complete search history.

(56) References Cited

U.S. PATENT DOCUMENTS

| | | | |
|---|---|---|---|
| 8,812,180 B2* | 8/2014 | Wachenheim | G08G 5/0039 701/3 |
| 2010/0282916 A1 | 11/2010 | Garrido-Lopez | |
| 2011/0077858 A1 | 3/2011 | Coulmeau et al. | |
| 2012/0053760 A1* | 3/2012 | Burnside et al. | G05D 1/0676 701/3 |
| 2013/0030611 A1* | 1/2013 | Constans et al. | G05D 1/0676 701/7 |
| 2014/0012436 A1* | 1/2014 | Coulmeau et al. | G05D 1/101 701/3 |

* cited by examiner

METHOD AND SYSTEM FOR DETERMINING A VERTICAL TRAJECTORY OF AN AIRCRAFT

This claims the benefit of French Patent Application FR 15 00517, filed Mar. 16, 2015 and hereby incorporated by reference herein.

The present invention relates to a method for determining in real time a vertical trajectory of an aircraft.

In particular, the invention applies to the determination of a descent trajectory of an aircraft along a flight plan.

A flight plan comprises a succession of geographical points, which are passage points for the aircraft, with which are associated possible altitude constraints. These altitude constraints each define an altitude above which, below which or at which the aircraft must fly to a given point in the horizontal plane. Each altitude constraint is thus associated with a constraint point above, below or through which the aircraft has to pass.

BACKGROUND

Conventionally, an aircraft is provided with a flight management system or (FMS), configured for determining a reference trajectory of the aircraft from the flight plan.

In particular, the flight management system is configured for determining an a priori descent trajectory, from the cruising altitude of the aircraft as far as an interrupted approach point, depending on a descent slope, which is generally defined by default, and on the flight plan, notably by observing the altitude constraints of this flight plan.

Such a descent trajectory generally comprises, from the cruising altitude of the aircraft, a descent phase according to the predefined descent slope, from a point for changing level generally called a top of descent point (TOD), followed by a succession of segments each corresponding to a level flight or to a descent phase as far as the interrupted approach point (MAP for «Missed Approach Point»), while observing the points of constraints.

During the actual descent of the aircraft along the thereby determined descent trajectory, the aircraft is subject to additional constraints, notably to deck altitudes set by the air traffic control authority. In particular, a descent phase can only be initiated when an agreement with the air control authority has been obtained, i.e. if the authorized deck altitude for the aircraft is less than the current altitude of the aircraft.

Consequently, in certain circumstances, the aircraft may attain the top of descent point without having been authorized to carry out the descent phase provided by the a priori trajectory. Moreover, a descent phase provided by the a priori trajectory may be interrupted if the authorized deck altitude for the aircraft is greater than the final altitude of the descent phase.

Under such circumstances, as soon as the authorized deck altitude is lowered, the aircraft initiates a descent phase with a higher descent slope than the initially intended descent slope, with the purpose of joining with the trajectory determined a priori.

SUMMARY OF THE INVENTION

Such a solution does not give entire satisfaction. Indeed, this solution may lead to adopting a high descent slope, in order to join up as quickly as possible with the initially intended trajectory, and therefore be a source of discomfort for the passengers of the aircraft, as well as generating an additional workload for managing the speed for the pilot.

An object of the invention is therefore to solve these drawbacks, in particular to provide a method and a system for handling the trajectory of an aircraft which gives the possibility of satisfying the constraints of the flight plan and the constraints imposed by the air traffic control authority while ensuring comfort of the passengers and minimizing the workload on the pilot.

For this purpose, is a method is provided for determining in real time a vertical trajectory of an aircraft, said method comprising:
  a step for providing an initial vertical trajectory comprising at least one initial phase for changing the flight level according to a first non-zero slope, between a first point at a first altitude, and a second point at a second altitude,
  at least one step for modifying the vertical trajectory of the aircraft, comprising:
    a phase for detecting a triggering element when the aircraft is at said first altitude,
    when said triggering element is detected, a phase for determining a modified vertical trajectory, said modified vertical trajectory comprising a modified phase for changing flight level according to a second non-zero predefined slope, from a modified point at said first altitude, distinct from said first point, towards said second altitude,
  the replacement of this initial vertical trajectory with said modified vertical trajectory.

Thus carried out, the method gives the possibility of determining in real time a trajectory which satisfies the constraints of the flight plan and the constraints imposed by the air traffic control authority, and the parameters of which, notably in terms of speed and of slope, are controlled.

According to other aspects, the method includes one or several of the following features:
  the phase for detecting the triggering element comprises the detection of a deviation, greater than a predetermined deviation threshold, between an altitude of the aircraft in a passage point in the horizontal plane and an altitude provided by said initial vertical trajectory at said passage point;
  said initial vertical trajectory successively comprises a level flight at said first altitude as far as said first point and said initial phase for changing level, and said triggering element is detected during the level flight of the aircraft at said first altitude;
  said initial vertical trajectory successively comprises an upstream phase of the changing of flight level from one point at a third altitude as far as said first point according to a third slope and said initial phase of changing level;
  the first altitude is comprised between the second altitude and the third altitude and said first slope is equal to said third slope;
  said triggering element comprises passing of said first point by the aircraft without said initial phase for changing the level having been initiated;
  said triggering element comprises actuation of a control for changing flight level by an operator before said first point has been attained by the aircraft;
  the method comprises the application of a plurality of successive steps for modifying the vertical trajectory of the aircraft, each step for modifying the vertical trajectory comprising:

a phase for detecting a triggering element when the aircraft is at said first altitude, when said triggering element is detected, a phase for determining a modified vertical trajectory, said modified vertical trajectory comprising a modified phase for changing flight level from a modified point at said first altitude, said modified point being distinct from the first point and from any modified point determined beforehand;

the initial phase for changing flight level is a descent phase.

when the aircraft attains said first point, said first altitude corresponds to a first authorized deck altitude for said aircraft, and the plurality of successive steps for modifying the vertical trajectory of the aircraft is applied until a second deck altitude below said first deck altitude is authorized for said aircraft.

the second slope is equal to the first slope.

The invention also provides a system for determining in real time a vertical trajectory of an aircraft, from an initial vertical trajectory comprising at least one initial phase for changing flight level according to a non-zero first slope, between a first point at a first altitude, and a second point at a second altitude, said system comprising:

a module for detecting a triggering element when the aircraft is at said first altitude, a module for determining a modified vertical trajectory configured for determining, when a triggering element is detected by said detection module, a modified vertical trajectory, said modified vertical trajectory comprising a modified phase for changing flight level according to a second non-zero predefined slope, from a modified point at said first altitude, distinct from said first point, to said second altitude.

BRIEF SUMMARY OF THE DRAWINGS

The invention will be further understood upon examining exemplary embodiments of the invention which will now be described with reference to the appended figures wherein.

DETAILED DESCRIPTION

Figure 1:
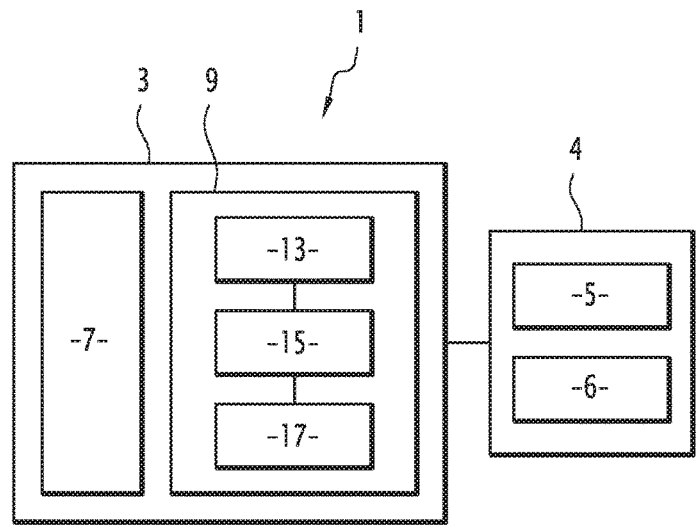
FIG. 1 schematically illustrates a management system according to an embodiment of the invention.

A system 1 for managing the trajectory of an aircraft according to an embodiment of the invention is schematically illustrated in FIG. 1.

The system 1 is configured for determining a trajectory of an aircraft, depending on a flight plan, and for modifying this trajectory, during flight of the aircraft, in real time, depending on notably altitude constraints, to which the aircraft is subject during this flight.

The system 1 comprises a computer 3 and man-machine interface means 4, notably a device 5 for displaying information intended for the crew of the aircraft and a device 6 for monitoring parameters.

The computer 3 includes a processor 7 and a memory 9.

The processor 7 is adapted for executing applications contained in the memory 9, notably an operating system allowing standard operation of a computer system.

The memory 9 comprises different memory zones containing software modules capable of being executed by the processor 7 and data sets.

In particular, the memory 9 comprises a module 13 for determining an initial trajectory of the aircraft, a module 15 for detecting a triggering element, and a module 17 for determining a modified trajectory of the aircraft.

The module 13 is configured for determining an initial trajectory of the aircraft, depending on a flight plan associated with a mission of the aircraft.

As recalled earlier, the flight plan comprises a succession of geographical points, which are passage points for the aircraft in a horizontal plane, with which are associated possible constraints, notably altitude, speed and time constraints. These altitude constraints each define an altitude above, below or at which the aircraft has to fly at a given point. Each altitude constraint is thus associated with a constraint point above, below or through which the aircraft has to pass.

In particular, the module 13 is configured for determining an initial side trajectory of the aircraft, defined in the horizontal plane, and an initial vertical trajectory of the aircraft, defined in a vertical plane, which observe the constraints defined by the flight plan.

These initial side and vertical trajectories are determined a priori according to the predefined constraints in the flight plan, but independently of common constraints, notably altitude constraints, imposed during the actual flight of the aircraft by the air traffic control authority.

A vertical trajectory is formed, in a vertical plane by a succession of rectilinear segments S, which each have a constant slope.

Figure 2:
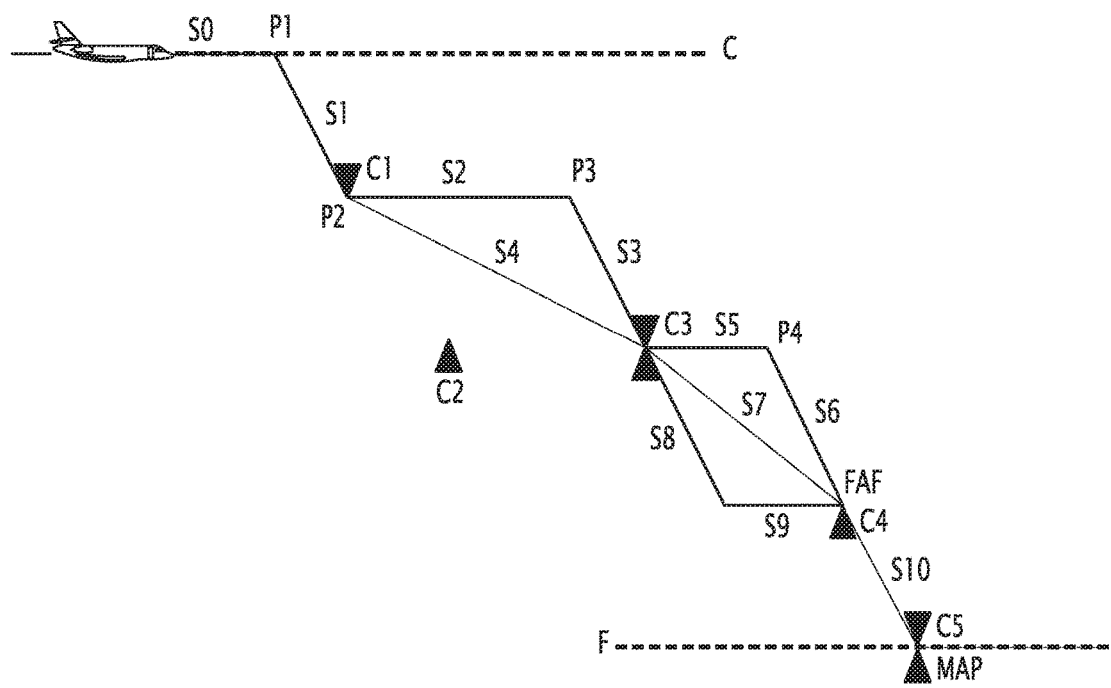
FIG. 2 illustrates an initial vertical trajectory of an aircraft.

As an example, a geometrical vertical trajectory profile of an aircraft is illustrated in FIG. 2, corresponding to several possible descent trajectories of the aircraft from its cruising altitude schematized by the horizontal line C, down to an interrupted approach point, noted as MAP for «Missed Approach Point», the altitude of which is schematized by the horizontal line F.

In FIG. 2, the vertical axis indicates the altitude of the aircraft relatively to a reference altitude, while the horizontal axis designates a curvilinear abscissa of the aircraft in a horizontal plane. The trajectories illustrated in FIG. 2 therefore represent the successive altitudes of the aircraft during a movement of the aircraft.

Moreover constraint points, corresponding to altitude constraints of the flight plan, which have to be observed by the aircraft during its descent, are illustrated in FIG. 2.

These constraint points comprise a constraint point C1 defining a maximum altitude of the aircraft in a given passage point in the horizontal plane, two constraint points C2, C4 define minimum altitudes of the aircraft in two other passage points in the horizontal plane, and two constraint points C3 and C5 defining an imposed altitude of the aircraft in a passage point in the horizontal plane.

The constraint point C4 defines a minimum altitude for the Final Approach Fix point (also noted as FAF). The point C3 corresponds to an Initial Approach Fix point (also noted as IAF), and the point C5 corresponds to the interrupted approach MAP point.

Several possible vertical trajectories of the aircraft are illustrated in FIG. 2, from the cruising altitude as far as the MAP point, observing the altitude constraints represented by the points C1, C2, C3, C4 and C5.

These trajectories each comprise several segments each corresponding to a descent phase according to a constant slope or a level flight phase.

Each trajectory comprises a first level flight phase at the cruising altitude (segment S0), followed by a descent phase (segment S1) from a point of changing level p1 called a Top of Descent point (TOD) as far as a point p2 corresponding to the constraint point C1. The descent phase S1 therefore forms a phase for changing level from a first point p1 at a first altitude, corresponding to the cruising altitude, down to a second point p2 at a second altitude.

In order to attain the constraint point C3, of imposed altitude, from the point p2, while passing above the constraint point C2, a first strategy consists of carrying out a level flight phase (segment S2), followed by a descent phase from a point of changing level p3 as far as the constraint point C3 (segment S3). A second strategy consists of carrying out a single descent phase from the point p2 as far as the constraint point C3 (segment S4). The point p2 is then also a point for changing level.

In order to attain the Final Approach Fix point (FAF) (which corresponds to the constraint point C4 in the illustrated example), a first strategy consists of carrying out a level flight phase (segment S5), followed by a descent phase from a point of changing level p4 as far as the Final Approach Fix point (FAF) (segment S6). A second strategy consists of carrying out a single descent phase from the constraint point C3 down to the Final Approach Fix point (FAF) (segment S7). A third strategy consists of carrying out a descent phase (segment S8) from the constraint point C3, followed by a level flight phase (segment S9) down to the Final Approach Fix point (FAF). According to the second and third strategies, the point C3 is also a point for changing level.

Finally, in order to attain the Missed Approach Point (MAP), of an imposed altitude and corresponding to the constraint point C5, one strategy consists of carrying out a single descent phase from the FAF point down to the MAP point (segment S10). The FAF point, corresponding to the constraint point C4, is then also a point for changing level.

It should be noted that the illustrated trajectories pass through the constraint points C1 and C4, but other trajectories passing below the point C1 and/or above the point C4 would also be conceivable.

These vertical trajectories thus comprise several phases for changing level, which are in the present case descent phases, each according to a given slope, from an initial point for changing level (points p1, p2, p3, C1, C3 or C4) at a first altitude as far as a second altitude.

The detection module 15 is configured for detecting, during the flight of the aircraft, a triggering element, in order to initiate the determination by the determination module 17 of a modified trajectory of the aircraft.

In particular, the initial vertical trajectory comprising an initial phase for changing flight level according to a first non-zero slope, between a first point, noted in a generic way as P1, at a first altitude A1, and a second point, noted as P2, at a second altitude A2, the detection module 15 is configured for detecting a triggering element when the aircraft is at the first altitude A1.

Generally, the triggering element corresponds to occurrence of a deviation, greater than a predetermined deviation threshold, between the altitude of the aircraft in a given point in the horizontal plane and the altitude in this given point as provided by the initial trajectory. The deviation threshold corresponds to a tolerance margin between the altitude of the aircraft and the altitude provided by the trajectory.

This discrepancy may result from a temporary impossibility for the aircraft to carry out a phase for changing level from the first altitude A1 as far as the second altitude A2, notably because of constraints of deck altitudes set by the air traffic control authority, which are not compatible with the initial vertical trajectory.

In this case, the triggering element is for example passing of the first point P1 by the aircraft without a change in level compliant with the associated level changing phase having been initiated.

As the phase for changing level is a descent phase from the first altitude A1 down to the second altitude A2 below the first altitude, such an event may occur when the aircraft attains the first point P1 without having been authorized by the air traffic control authority to carry out the descent phase, the deck altitude being equal to the current altitude of the aircraft.

Figure 3:
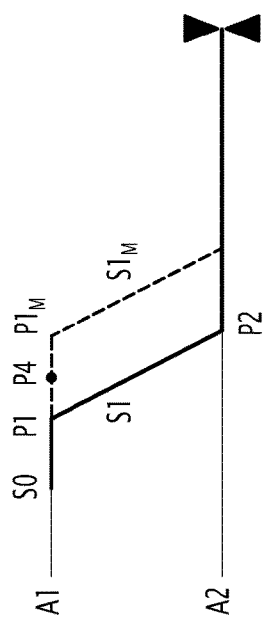
FIG. 3 illustrates a first exemplary modified vertical trajectory of an aircraft.

According to a first example, illustrated in FIG. 3, the initial vertical trajectory illustrated in solid lines, comprises a level flight phase S0 at the first altitude A1, followed by the phase S1 for changing flight level from the first altitude A1 to the second altitude A2, the first point P1 then being a point for changing level.

In this example, the triggering element is the attaining by the aircraft of a point P4, located at the first altitude downstream from the point P1 relatively to the trajectory followed by the aircraft.

Figure 4:
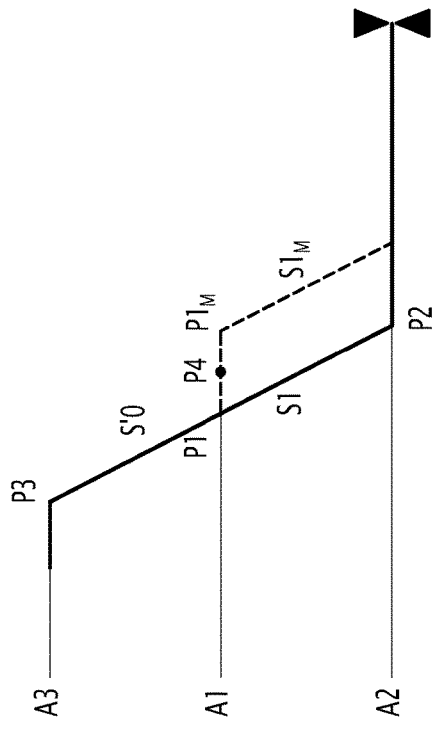
FIG. 4 illustrates a second example of a modified vertical trajectory of an aircraft.

According to a second example, illustrated in FIG. 4, the initial vertical trajectory illustrated in solid lines, comprises an upstream phase S'0 for changing level from a third point P3 at a third altitude A3 as far as the first point P1, according to a third slope, followed by the phase S1 for changing level from the first point P1 at the first altitude A1 as far as the second point P2 at the second altitude A2.

The first and third slopes are for example equal, the upstream phase S'0 for changing level and the phase S1 for changing level then forming together a phase for changing level from the third point P3 at the third altitude A3 as far as the second point P2 at the second altitude A2, while passing through the first point P1 at the first altitude A1.

If, during the descent of the aircraft from the third point P3 according to the upstream phase S'0 for changing level, when the aircraft attains the first point P1, the authorized deck altitude for the aircraft is equal to the first altitude A1, the aircraft exceeds the first point P1 without initiating the phase S1 for changing level provided by the initial trajectory, i.e. interrupts its descent at the first altitude A1.

For example, such an event may occur when the authorized deck altitude for the aircraft is greater than the final altitude of a descent phase: this descent phase is then interrupted at the deck altitude.

In this second example, the triggering element is also the attaining by the aircraft of a point P4, located at the first altitude downstream from the point P1 relatively to the trajectory followed by the aircraft.

The discrepancy between the trajectory provided by the aircraft and the actually followed trajectory by the aircraft may also result from a manual action of an operator, for example upon actuating a command for changing flight level before attaining a point for changing level.

Figure 5:
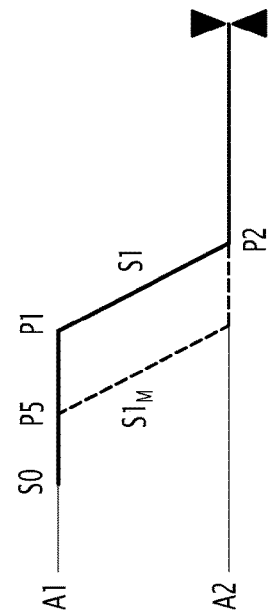
FIG. 5 illustrates a third example of a modified vertical trajectory of an aircraft.

In this case, according to a third example illustrated in FIG. 5, wherein the initial vertical trajectory is similar to the one illustrated in FIG. 3, the triggering element is the initiation of a phase for changing level from the first altitude A1 to the second altitude A2 from a point P5 at the first altitude located upstream from the point P1 relatively to the trajectory followed by the aircraft, i.e. before the aircraft attains the point P1.

The determination module 17 is configured for determining in real time, when a triggering element is detected by the module 15, a modified vertical trajectory, different from the provided vertical trajectory.

The modified vertical trajectory is a vertical trajectory compatible with the actual trajectory of the aircraft.

The modified vertical trajectory comprises at least one modified phase for changing flight level different from the phase for provided corresponding phase for changing flight level. In particular, the modified phase for changing flight level corresponds to the phase for changing flight level affected by the triggering element.

The modified phase for changing level is initiated from a modified point, noted as $P1_M$, located at the first altitude. The modified point $P1_M$ is distinct from the first point P1, i.e. the point for changing level provided according to the initial vertical trajectory.

Further, the modified phase for changing level is achieved according to a predetermined and controlled slope.

The predetermined slope is for example equal to the slope of the provided phase for changing flight level.

Preferably, the predetermined slope is comprised in a set slope interval, for example between 2.75 and 3.6 degrees, corresponding to an interval in which a comfort level of the passengers is ensured and the management of the speed is facilitated.

The predetermined slope is for example adjustable by the pilot within this interval, by means of the device 6 for monitoring parameters.

Preferably, the modified phase for changing level forms a segment from the modified point $P1_M$ at the first altitude A1 as far as a point at the second altitude A2, generally distinct from the second point P2.

The modified point $P1_M$ is upstream or downstream from the first point P1.

Notably, when the triggering element is a passing of the first point P1 by the aircraft without any change in level according to the associated phase for changing level having been initiated, the modified point $P1_M$ is downstream from the first point P1 relatively to the trajectory followed by the aircraft, as illustrated in FIGS. 3 and 4.

Further, in this case, the modified point $P1_M$ is also downstream from the current position of the aircraft relatively to the trajectory followed by the aircraft. Thus, the modified point $P1_M$ is a point which has not yet been attained by the aircraft at the moment when the modified vertical trajectory is determined.

When the triggering element is the initiation of a phase for changing level of the first altitude A1 to the second altitude A2 from a point P5 at the first altitude located upstream from the point P1 relatively to the trajectory followed by the aircraft, the modified point $P1_M$ is located downstream from the first point P1: the modified point $P1_M$ is the point P5 at which the phase for changing level is initiated, as illustrated in FIG. 5.

According to the examples illustrated in FIGS. 3, 4 and 5, the modified vertical trajectory illustrated in dotted lines, comprises a modified phase $S1_M$ for changing flight level according to a second predefined slope, from the modified point $P1_M$ for changing level at the first altitude A1 to the second altitude A2, and preferably as far as the second altitude A2. In these examples, the second slope is equal to the first slope.

The thereby determined modified vertical trajectory by the module 17 replaces the initially determined trajectory. Further, this trajectory is compatible with the actual trajectory of the aircraft, provided, for the examples of FIGS. 3 and 4 that the aircraft receives an authorization for changing flight level at the latest when it will attain the modified point $P1_M$ for changing level.

Moreover, the system 1 is configured for determining in real time at least two successive modified vertical trajectories, the first modified vertical trajectory replacing the initial vertical trajectory and the modified vertical trajectory(ies) determined earlier by the system 1.

In particular, when a stress prevents a change in level from the first altitude A1 to the second altitude A2, the system 1 is configured for successively determining a plurality of modified trajectories until a change in level from the first altitude to the second altitude, notably as far as the second altitude or an intermediate altitude is authorized.

Thus, when a stress prevents a change in level from the first altitude A1 to the second altitude A2, the detection module 15 is configured for detecting a first triggering element, consisting in passing of the first point P1 without the level changing phase S1 having been initiated, the aircraft remaining at altitude A1. The determination module 17 is configured for determining, when this first triggering element is detected, a first modified vertical trajectory, different from the provided vertical trajectory. This first modified vertical trajectory comprises a first modified phase for changing level initiated from a first modified point, noted as $P1_M^1$, located at the first altitude, downstream from the first point P1.

Next, if the stress still prevents a change in level from the first altitude A1 to the second altitude A2 when the aircraft attains the first modified point $P1_M^1$, the first modified vertical trajectory cannot be followed by the aircraft. The detection module 15 is configured for detecting a second triggering element, consisting in passing of the first modified point $P1_M^1$ without the modified level changing phase having been initiated, the aircraft remaining at the first altitude A1. The determination module 17 is then configured for determining, when this second triggering element is detected, a second modified vertical trajectory, different from the first modified vertical trajectory. This second modified vertical trajectory comprises a second level changing modified phase initiated from a second modified point $P1_M^2$ located at the first altitude downstream from the first point P1 and from the first modified point $P1_M^1$.

More generally, the detection module 15 is configured for successively detecting several triggering elements, each consisting in passing by the aircraft of the provided point for changing flight level, which is first of all the first point P1 and then the modified point lastly determined by the determination module 17, without the modified level changing phase having been initiated, the aircraft remaining at the first altitude A1.

Also, the determination module 17 is configured for determining, every time a triggering element is detected, a modified vertical trajectory, different from the first modified vertical trajectory and from any modified vertical trajectory determined beforehand. This modified vertical trajectory comprises a modified level changing phase initiated from a modified point $P1_M^i$ located at the first altitude downstream from the first point P1 and of any modified point $P1_M^1 \ldots P1_M^{i-1}$ determined beforehand.

Figure 6:
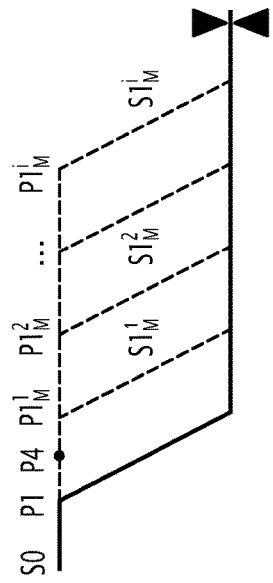
FIG. 6 illustrates an example of successive modified vertical trajectories.

Several modified vertical trajectories are thus illustrated in FIG. 6, which may be successively determined by the module 17 when an altitude constraint, imposed to the aircraft, prevents a changing in flight level from the first altitude to the second altitude, until this constraint is lifted.

In this example, the initial vertical trajectory similar to the one illustrated in FIG. 3, comprises a level flight phase S0 at the first altitude A1, followed by a phase S1 for changing flight level from the first altitude A1 to the second altitude A2 from the first point P1, according to a first slope.

A first triggering element which may be detected by the detection module 15 is the passing of the first point P1 during the flight of the aircraft at the first altitude A1. The first modified trajectory which may be calculated by the determination module 17 comprises a first modified phase $S1_M^1$ for changing level, from a first modified point $P1_M^1$ for changing level at the first altitude A1 as far as the second altitude A2, according to a second slope, which in the example is illustrated as equal to the first slope.

Next, if the deck altitude imposed to the aircraft remains equal to the first altitude when the aircraft attains the first modified point $P1_M^1$, the detection module 15 is able to detect the passing of the first modified point $P1_M^1$, which results therefrom, and which is a second triggering element. The determination module 17 is then able to determine a second modified trajectory, comprising a second modified phase $S1_M^2$ for changing level, from a second modified point $P1_M^2$ for changing level at the first altitude A1 as far as the second altitude A2, according to a second slope, which in the illustrated example is equal to the first slope.

Similarly, as long as the deck altitude remains equal to the first altitude, the aircraft cannot initiate a change in altitude and exceeds any first modified point $P1_M^1, \ldots, {}^{i-1}$ determined beforehand by the determination module 17. The detection module 15 is able to detect each passing, for causing determination in real time by the determination module 17 of a new modified vertical trajectory, different from the first modified vertical trajectory and from any modified vertical trajectory determined beforehand, comprising a modified phase $S1_M^i$ for changing level initiated from a new modified point $P1_M^i$, located at the first altitude A1 downstream from the first point P1 and of any modified point $P1_M^1 \ldots P1_M^{i-1}$ determined beforehand.

This thereby determined modified vertical trajectory by the module 17 replaces the vertical trajectory determined beforehand.

Figure 7:
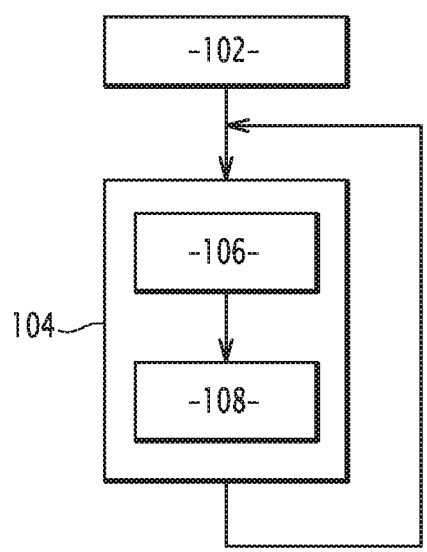
FIG. 7 is a block diagram illustrating the application of a method according to an embodiment of the invention.

An example of application of a method according to an embodiment of the invention, by means of the system 1, will now be described, with reference to FIG. 7 and to FIGS. 3 to 6.

The method comprises a step 102 for providing an initial vertical trajectory for the aircraft, this initial vertical trajectory comprising at least one initial phase for changing flight level according to a first non-zero slope, between a first point P1 at a first altitude A1, and a second point P2 at a second altitude A2.

Generally, the initial vertical trajectory comprises several initial phases for changing flight level. In particular, the initial vertical trajectory comprises several initial phases for changing flight level, intended to be applied during an approach phase.

The initial vertical trajectory is for example determined by the module 13, depending on the predefined constraints in the flight plan.

The method moreover comprises, when a discrepancy appears between the initial vertical trajectory and the vertical trajectory actually followed by the aircraft, at least one step 104 for modifying the vertical trajectory of the aircraft. This step 104 is intended to provide in real time to the aircraft and to its crew an updated vertical trajectory which is consistent with the actual vertical trajectory of the aircraft.

Said or each step 104 for modifying the trajectory comprises a phase 106 for detecting a triggering element when the aircraft is at the first altitude A1.

The detection phase 106 is applied by the detection module 15.

In particular, the phase 106 for detecting the triggering element comprises the detection by the module 15 of a deviation, greater than a predetermined deviation threshold, between an altitude of the aircraft in a passage point in the horizontal plane and an altitude provided by said initial vertical trajectory at this passage point.

As illustrated in FIGS. 3 and 4, the triggering element for example comprises passing of the first point P1 by the aircraft without having initiated the initial phase for changing level from the first altitude A1 to the second altitude A2.

As illustrated in FIG. 5, the triggering element may also be actuation of a command for changing flight level by a pilot before the first point P1 has been attained by the aircraft.

Said or each step 104 for modifying the trajectory then comprises, i.e. when the triggering element is detected, a phase 108 for determining a vertical trajectory modified by the determination module 17. The modified vertical trajectory comprises a modified phase $S1_M$ for changing flight level, according to a second non-zero predefined slope, from a first modified point $P1_M$ at the first altitude A1 towards the second altitude A2.

The modified point $P1_M$ is distinct from the first point P1. The modified point $P1_M$ is downstream or upstream from the first point P1.

Notably, if the triggering element is a passing of the first point P1 by the aircraft without any initiation of a change of level according to the associated level changing phase, the modified point $P1_M$ is downstream from the first point P1 with respect to the trajectory followed by the aircraft (FIGS. 3 and 4).

Further, the modified point $P1_M$ is also downstream from the current position of the aircraft with respect to the trajectory followed by the aircraft. Thus, the modified point $P1_M$ is a point which has not yet been attained by the aircraft at the moment when the modified vertical trajectory is determined.

If the triggering element is the initiation of a phase for changing level from the first altitude A1 to the second altitude A2 from a point P5 at the first altitude located upstream from the point P1 with respect to the trajectory followed by the aircraft, the modified point $P1_M$ is located upstream from the first point P1: the modified point $P1_M$ is the point P5 at which the level changing phase is initiated, as illustrated in FIG. 5.

Further, the modified level changing phase is achieved according to a predetermined and controlled slope.

The predetermined slope is for example equal to the slope of the provided phase for changing flight level. The predetermined slope is for example adjustable by the pilot within a predetermined interval.

Preferably, the modified level-changing phase forms a segment from the modified point $P1_M$ at the first altitude A1 as far as a point at the second altitude A2, generally distinct from the second point P2.

Subsequently to step 104 for modifying the trajectory, the modified vertical trajectory as determined by the module 17 during the phase 108 is displayed, intended for the crew, notably on the information display device 5.

If the triggering element resulted from the actuation of a command for changing flight level by a pilot before the first point P1 has been attained by the aircraft, the aircraft follows the modified vertical trajectory, notably the modified phase for changing level from the first altitude A1 to the second altitude A2 according to the second slope.

In particular, if the level-changing phase is a descent phase, the aircraft carries out the level change as far as the second altitude A2 if this altitude is accessible to it, the deck altitude being less than or equal to the second altitude. On the other hand, if during the flight level change from the first altitude to the second altitude, the altitude of the aircraft becomes equal to the deck altitude before attaining the second altitude, i.e. if the authorized deck altitude is comprised between the first altitude A1 and the second altitude A2, the aircraft interrupts its descent at this deck altitude. The system 1 then applies a new step 104 for modifying the trajectory in order to determine a modified trajectory compliant with the actual trajectory of the aircraft.

In the case when the triggering element resulted from passing of the first point P1 by the aircraft without initiation of the initial phase for changing level from the first altitude A1 to the second altitude A2, in particular because of a deck altitude constraint incompatible with such a level changing phase, the system 1 applies, if necessary, a plurality of steps 104 of the trajectory, until a change in level towards the second level is authorized.

The modification steps 104 are carried out in an iterative way, each modified vertical trajectory determined during an iteration i of step 104 replacing the modified vertical trajectory determined during the iteration i−1 immediately preceding the iteration i of step 104.

During each of the modification steps 104, the module 15 detects during a phase 106 a triggering element. The first triggering element is the passing of the first point P1, and then, during each phase 106, the module 15 detects the passing of the modified point $P1_M^{i-1}$ determined during iteration i−1 of step 104 immediately preceding the current iteration of this step 104.

Moreover, during each phase 108, the module 17 determines a modified phase St for changing level initiated from a modified point $P1_M^i$, located at the first altitude A1 downstream from the first point P1 and, if i>1, located downstream from any modified point $P1_M^1 \ldots P1_M^{i-1}$ determined beforehand.

Each thereby determined modified vertical trajectory by the module 17 replaces the vertical trajectory determined beforehand.

If, when the aircraft arrives in a modified point $P1_M^i$, the authorized deck altitude for the aircraft is less than the first altitude A1, the aircraft follows the last modified trajectory determined by the module 17, in particular the modified phase $S1_M^i$ for changing level from the first altitude A1 to the second altitude A2, from the modified point $P1_M^i$.

In particular, the aircraft performs the change in level as far as the second altitude A2 if this altitude is accessible to it, the deck altitude being less than or equal to the second altitude. On the other hand, if during the change in flight level from the first altitude to the second altitude, the altitude of the aircraft becomes equal to the deck altitude before attaining the second altitude, i.e. if the authorized deck altitude is comprised between the first and the second altitudes, the aircraft interrupts its descent at this deck altitude. The system 1 then applies a new step 104 for modifying the trajectory in order to determine a modified trajectory compliant with the actual trajectory of the aircraft.

The method and the system according to the invention may give the possibility of determining in real time a trajectory which meets the constraints of the flight plan and the constraints imposed by the air traffic control authority, and the parameters of which, notably in terms of sleep and slope, are controlled.

The method and the system according to the invention may thus give the possibility of guaranteeing comfort of the passengers and facilitating handling of the speed in the case of excursions out of the initially determined vertical trajectory.

However it should be understood that the embodiments described above are not limiting.

Notably, the modification method according to the invention may be applied several times during a mission of the aircraft, notably when a deviation occurs between the provided vertical trajectory and the actual vertical trajectory of the aircraft.

What is claimed is:

1. A method for determining in real time a planned vertical trajectory of an aircraft, the method comprising:
providing an initial planned vertical trajectory of a flight plan of the aircraft, the initial planned vertical trajectory comprising at least an initial planned level changing phase for a change in a flight level of the aircraft according to a first non-zero slope, between a first point and a second point, the first point being at a first altitude at which the initial planned level changing phase for the change in the flight level of the aircraft is planned to be initiated according to the initial planned vertical trajectory, the second point being at a second altitude at which the aircraft is planned to be at following the initial planned level changing phase according to the initial planned vertical trajectory,
performing at least one modification of the planned vertical trajectory of the flight plan of the aircraft from the initial planned vertical trajectory to a modified planned vertical trajectory, comprising:
detecting a triggering element when the aircraft is at the first altitude of the initial planned vertical trajectory, the detection of the triggering element comprising detecting a deviation, greater than a predetermined deviation threshold, between the first altitude of the aircraft in a passage point and an altitude provided by the initial planned vertical trajectory at the passage point,
when the triggering element is detected, determining the modified planned vertical trajectory, the modified planned vertical trajectory comprising a modified planned level changing phase for a modified change in flight level according to a second predefined non-zero slope, from a modified point at the first altitude, distinct from the first point, to the second altitude, the determining of the modified planned vertical trajectory comprising determining a position of the modified point at the first altitude and determining the second predefined non-zero slope for the modified change in flight level from the modified point at the first altitude, and
modifying the flight plan by replacing the initial planned vertical trajectory by the modified planned vertical trajectory.

2. The determination method as recited in claim 1 wherein the initial planned vertical trajectory successively comprises a level flight at the first altitude as far as the first point and the initial planned level changing phase, the triggering element being detected during the level flight of the aircraft at the first altitude.

3. The determination method as recited in claim 2 wherein the triggering element comprises passing the first point by the aircraft without the initial planned level changing phase having been initiated.

4. The determination method as recited in claim 2 wherein the triggering element comprises actuating a changing flight level command by an operator before the first point has been attained by the aircraft.

5. The determination method as recited in claim 1 wherein the initial planned vertical trajectory successively comprises an upstream phase for an upstream change in flight level from a point at a third altitude as far as the first point according to a third slope and the initial planned level changing phase.

6. The determination method as recited in claim 5 wherein the first altitude is comprised between the second altitude and the third altitude and the first slope is equal to the third slope.

7. The determination method as recited in claim 5 wherein the triggering element comprises passing the first point by the aircraft without the initial planned level changing phase having been initiated.

8. The determination method as recited in claim 5 wherein the triggering element comprises actuating a changing flight level command by an operator before the first point has been attained by the aircraft.

9. The determination method as recited in claim 1 further comprising applying a plurality of successive modifications of the vertical planned trajectory of the aircraft, each modification of the planned vertical trajectory comprising:
   detecting a further triggering element when the aircraft is at the first altitude, and
   when the further triggering element is detected, determining a further modified planned vertical trajectory, the further modified planned vertical trajectory comprising a further modified planned level changing phase for a further modified change in flight level from a further modified point at the first altitude, the further modified point being distinct from the first point and from any modified point determined beforehand.

10. The determination method as recited in claim 9 wherein the triggering element comprises passing the first point by the aircraft without the initial planned level changing phase having been initiated, the initial planned level change phase is a descent phase, when the aircraft attains the first point, the first altitude corresponds to a first authorized deck altitude for the aircraft, and wherein the plurality of successive modifications of the planned vertical trajectory of the aircraft is applied until a second deck altitude, below the first deck altitude is authorized for the aircraft.

11. The determination method as recited in claim 1 wherein the initial planned level changing phase is a descent phase.

12. The determination method as recited in claim 1 wherein the second slope is equal to the first slope.

13. The determination method as recited in claim 1, further comprising displaying the modified planned vertical trajectory on a display device.

14. A system for determining in real time a planned vertical trajectory of an aircraft, from an initial planned vertical trajectory comprising at least one initial planned level changing phase for a change in a flight level of the aircraft according to a first non-zero slope, between a first point and a second point, the first point being at a first altitude at which the initial planned level changing phase for the change in the flight level of the aircraft is planned to be initiated according to the initial planned vertical trajectory, the second point being at a second altitude at which the aircraft is planned to be at following the initial planned level changing phase according to the initial planned vertical trajectory, the system comprising:
   a detector configured for detecting a triggering element when the aircraft is at the first altitude of the initial planned vertical trajectory, the detection of the triggering element comprising detecting a deviation, greater than a predetermined deviation threshold, between the first altitude of the aircraft in a passage point and an altitude provided by the initial planned vertical trajectory at the passage point; and
   a determination module configured for determining a modified planned vertical trajectory, and configured for, when the triggering element is detected by the detector, determining the modified planned vertical trajectory, the modified planned vertical trajectory comprising a modified planned level phase for changing a modified change in flight level according to a second predefined non-zero slope, from a modified point at the first altitude, distinct from the first point, to the second altitude, the determination module being configured to determine a position of the modified point at the first altitude and to determine the second predefined non-zero slope for the modified change in flight level from the modified point at the first altitude the determination module being configured to modify the flight plan by replacing the initial planned vertical trajectory by the modified planned vertical trajectory.

15. A method for determining in real time a planned vertical trajectory of an aircraft, the method comprising:
   providing an initial planned vertical trajectory of a flight plan of the aircraft, the initial planned trajectory comprising at least an initial planned level changing phase for a change in a flight level of the aircraft according to a first non-zero slope, between a first point and a second point, the first point being at a first altitude at which the initial planned level changing phase for the change in the flight level of the aircraft is planned to be initiated according to the initial planned vertical trajectory, the second point being at a second altitude at which the aircraft is planned to be at following the initial planned level changing phase according to the initial planned vertical trajectory,
   performing at least one modification of the planned vertical trajectory of the flight plan of the aircraft, from the initial planned vertical trajectory to a modified planned vertical trajectory, comprising:
   detecting a triggering element when the aircraft is at the first altitude of the initial vertical trajectory,
   when the triggering element is detected, determining the modified planned vertical trajectory, the modified planned vertical trajectory comprising a modified planned level changing phase for a modified change in flight level according to a second predefined non-zero slope, from a modified point at the first altitude, distinct from the first point, to the second altitude, the determining of the modified planned vertical trajectory comprising determining a position of the modified point at the first altitude, the modified point being located upstream from the first point along the initial planned vertical trajectory, and determining the second predefined non-zero slope for the modified change in flight level from the modified point at the first altitude, and modifying the flight plan by replacing the initial planned vertical trajectory by the modified planned vertical trajectory.

16. The determination method as recited in claim 15 wherein the detection of the triggering element comprises the detection of a deviation, greater than a predetermined deviation threshold, between the first altitude of the aircraft in a passage point and an altitude provided by the initial planned vertical trajectory at the passage point.

* * * * *